(12) United States Patent
Cornwall

(10) Patent No.: US 8,269,649 B2
(45) Date of Patent: Sep. 18, 2012

(54) RELATIVE TIME SYSTEM

(75) Inventor: Mark Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 752 days.

(21) Appl. No.: 12/362,350

(22) Filed: Jan. 29, 2009

(65) Prior Publication Data

US 2010/0188255 A1    Jul. 29, 2010

(51) Int. Cl.
*G08B 23/00* (2006.01)
*G08C 15/06* (2006.01)
(52) U.S. Cl. ............. 340/870.02; 705/412; 702/176
(58) Field of Classification Search .......... None
See application file for complete search history.

(56) References Cited

U.S. PATENT DOCUMENTS

| | | | | |
|---|---|---|---|---|
| 5,994,892 A | * | 11/1999 | Turino et al. | 324/142 |
| 6,006,212 A | * | 12/1999 | Schleich et al. | 705/412 |
| 6,598,003 B1 | * | 7/2003 | Heino et al. | 702/68 |
| 7,109,882 B2 | * | 9/2006 | Angelis et al. | 324/142 |
| 2006/0224335 A1 | | 10/2006 | Borleske et al. | |
| 2007/0124109 A1 | | 5/2007 | Timko et al. | |
| 2008/0219210 A1 | | 9/2008 | Shuey et al. | |
| 2009/0167291 A1 | * | 7/2009 | Richeson et al. | 324/107 |
| 2009/0228224 A1 | * | 9/2009 | Spanier et al. | 702/60 |

OTHER PUBLICATIONS

Written Opinion of the International Searching Authority for PCT International Application No. PCT/US2009/068047 dated Feb. 5, 2010.
International Search Report for PCT International Application No. PCT/US2009/068047 mailed Feb. 24, 2010.

* cited by examiner

*Primary Examiner* — Rexford Barnie
*Assistant Examiner* — Justen Fauth
(74) *Attorney, Agent, or Firm* — Dority & Manning, P.A.

(57) ABSTRACT

A system, method and device are provided for obtaining, from each endpoint device, meter reading data where the meter reading data are recorded and managed based on a relative time clock in each endpoint device. The relative time clock may be a simple inexpensive clock that tracks minutes and triggers recording of meter reading data for a particular hour at the end of that hour. In that embodiment, a collection system sends an endpoint device a request that includes a requested time that is converted into a relative time so that the endpoint device can understand the request. Since each recorded interval is generated based on a relative time maintained by the clock in the endpoint device rather than an absolute (real) time, the endpoint device does not need to maintain accurate date/time or to read meter reading data from the utility meter based on a real date/time.

8 Claims, 4 Drawing Sheets

RELATIVE TIME SYSTEM

BACKGROUND

Through advancements in metering infrastructure, the collection of meter readings that quantify the consumption of utility services (i.e., natural gas, water, electricity, etc.) is being automated. In an automated meter reader system, "endpoint devices" coupled to utility meters are typically used to collect and record the meter readings for transmission to reader devices. The endpoint devices that are configured to communicate consumption data in this way are commercially available and increasingly being installed in homes, businesses, and the like.

In some automated meter reader systems, the endpoint devices are configured to record meter readings at predetermined intervals and to transmit the meter readings to a reader device. In some cases, the endpoint devices include a microprocessor-implemented real time clock that is used when recording meter reading data or transmitting meter reading data. In such cases, synchronization among various endpoint devices and reader devices is necessary within the automated meter reader system. However, such synchronization has been a challenge due to the time differences among time zones, daylight savings time adjustment, leap year adjustment, etc.

In other implementations, each endpoint device includes a simple timing device, which eliminates the need of real time synchronization among the endpoint devices. In these implementations, the reader device, which collects meter reading data from the endpoint devices, typically adds a timestamp to the collected meter reading data.

In an ideal environment, the time-stamped data are processed later in a processing system and thus the reader device does not need to perform much computation other than adding timestamps. However, if the endpoint device time has drifted, the reader device cannot simply timestamp the collected data. In most cases, the reader device and the endpoint device exchange several messages to determine the time drift and to generate accurate timestamps for the collected data. For some types of meter reading systems, in particular, for a meter reading system that includes a small number of reader devices that collect meter readings from a large number of endpoint devices, this can possibly lead to overburdening the reader devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system, method and device are provided for obtaining, from each endpoint device, the meter reading data for a specific period of time where the meter reading data are recorded and managed based on a relative time clock in the endpoint device. In one embodiment, the meter reading data may be recorded in a fixed number of intervals and stored in each endpoint device that operates according to a relative time clock. The relative time clock may be a simple inexpensive clock that tracks minutes and triggers recording of meter reading data for a particular hour at the end of that hour. In that embodiment, a collection system sends a request to an endpoint device that includes a requested time. The requested time has been converted into a relative time so that the endpoint device can understand the request. In this embodiment, after the conversion, the requested time may be represented by a certain set of intervals. In one aspect, the recorded intervals stored in the endpoint device may be used to determine consumption data for any time period from the past 40 days, which allows the collection system to collect meter reading data in later time, on its own schedule. Also, the endpoint device uses a relative time clock to record the meter reading data, which simplifies logic of the endpoint device to collect meter readings from the utility meter. Further, the endpoint devices and the collection system do not need to be accurately synchronized to each other all the time if the consumption data is calculated at a specific hour but not at specific minutes.

In accordance with an aspect of one embodiment, a method is provided to obtain meter reading data from an endpoint device that operates in accordance with a relative time clock. The method includes converting an order time into a relative time, generating a request including the converted relative time, and transmitting to the endpoint device the generated request. In one embodiment, when the order time is converted, an offset of interval numbers are calculated based on a current time of the collection system and the order time. Subsequently, a response to the transmitted request is received from the endpoint where the response includes a set of recorded intervals. In one aspect, the relative time is used by the endpoint device to retrieve the set of recorded intervals. The received response is processed to extract data relevant to the order request.

In accordance with another aspect of one embodiment, an apparatus is provided for obtaining meter reading data from an endpoint device that is configured to operate in accordance with a relative time clock. The apparatus comprises a communication unit and a processing unit. The communication unit is configured to obtain an order request to receive meter reading data from an endpoint device. The processing unit is operable to determine a requested time specified in the order request, convert the requested time into a relative time that is used by the endpoint device to retrieve a correct set of recorded intervals and generate a request for consumption data including the converted relative time. The communication unit transmits the request to the endpoint device. After the communication unit receives from the endpoint device a response to the transmitted request, the processing unit processes the response to extract data relevant to the order request.

In accordance with yet another aspect of one embodiment, a computer-readable medium having computer-executable components is provided for collecting meter reading data from an endpoint device. The computer-executable components comprise a calculating component and consumption collection component. The calculating component is configured to calculate the consumption of a utility service over relative time meter readings. The consumption collection component is operative to obtain an order request for an endpoint device and cause the calculating component to convert an order time into a relative time that is used by the endpoint device to retrieve a correct set of recorded intervals. A request including the converted relative time is generated and transmitted to the endpoint device. A response is received from the endpoint device where the response includes the correct set of recorded intervals and is processed to extract data relevant to the order request.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings is intended as a description of various embodiments of the disclosed subject matter and is not intended to represent the only embodiments. Generally stated, a collection system is configured to obtain, from each endpoint device, the meter reading data for a specific period of time where the meter reading data are recorded and managed based on a relative time clock in the endpoint device. In one embodiment, the meter reading data may be recorded in a fixed number of intervals and stored in each endpoint device that operates according to a relative time clock. The relative time clock may be a simple inexpensive clock that tracks minutes and triggers recording of meter reading data for a particular hour at the end of that hour. In that embodiment, a collection system sends a request to an endpoint device that includes a requested time. The requested time has been converted into a relative time by the collection system so that the endpoint device can understand the request. In this embodiment, after the conversion, the requested time may be represented by a certain set of intervals.

Each embodiment described in this disclosure is provided merely as an example or illustration and should not be construed as preferred or advantageous over other embodiments. In this regard, the following description first provides an overview of a metering environment in which the disclosed subject matter may be implemented. Then, several examples of routines used for recording meter reading data at intervals and providing meter reading data with adjusted time are described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
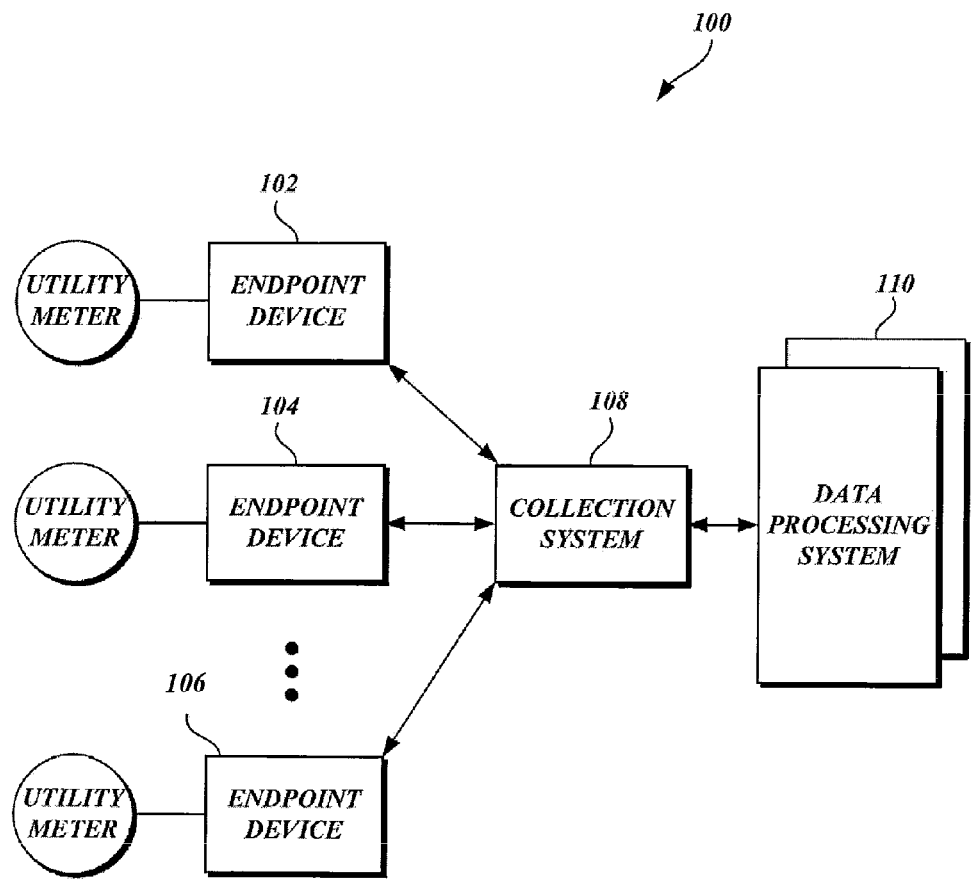
FIG. 1 is a block diagram depicting an illustrative metering environment suitable for obtaining meter reading from an endpoint device that operates according to a relative time in accordance with an embodiment of the disclosed subject matter.

Referring now to FIG. 1, the following is intended to provide a general overview of one embodiment of a meter reading system 100 in which aspects of the disclosed subject matter may be implemented. Generally described, the meter reading system 100 depicted in FIG. 1 includes a plurality of endpoint devices 102-106 associated with, for example, utility meters (e.g., gas meters, water meters, electric meters, etc.), for obtaining data, such as meter data (e.g., consumption data, tampering data, etc.) therefrom. Each endpoint device 102 in the meter reading system 100 may be a wired or wireless communications device capable of performing two way communications with the collection system 108 utilizing automated meter reading protocols. For example, the endpoint devices 102 are capable of receiving data (e.g., messages, commands, etc.) from the collection system 108 and transmitting meter reading data and/or other data to the collection system 108. Depending on the exact configuration and types of devices used, the endpoint devices 102-106 transmit data either periodically ("bubble-up"), in response to a wake-up signal, in response to a request from the collection system, in a combination/hybrid configuration. In each instance, the endpoint devices 102-106 are configured to exchange data with the collection system 108.

In some embodiments, the collection system 108 may employ some type of a protocol to communicate with the endpoint devices 102-106. The collection system 108 is suitable to transmit a request to the endpoint devices for obtaining meter reading data and to receive messages including meter reading data from the endpoint devices. In this regard, the collection system 108 may be a fixed network comprised of Cell Control Units ("CCU") that collect radio-based meter readings within a particular geographic area. The meter readings received from the endpoint devices 102-106 may be processed and forwarded by a CCU to a data processing system 110. In some embodiments, the collection system 108 may include a drive-by reading system or a mobile reading system (e.g., a system employing field vehicles and portable reader devices) that collects meter readings while a field vehicle is driving through a particular geographic area. Those skilled in the art and others will recognize that the collection of meter readings may be performed utilizing other meter reading systems (e.g., mesh/micro networks, handheld devices, Telephone-Base, etc.) and the examples provided herein should be construed as exemplary.

In one aspect, the collection system 108 is configured to leverage the two-way communication capabilities of the endpoint devices 102-106 when meter readings are collected from the endpoint devices. As will be discussed in further detail below, the endpoint devices 102-106 may be configured to record and manage meter readings according to a relative time clock. For example, the endpoint devices 102-106 may be configured to record meter readings at particular intervals, calculate the current consumption data based on a correct set of intervals, and transmit the calculated consumption data in response to a request from the collection system. In one aspect, the endpoint devices record meter readings in such a way that any calculations on the fly performed by the collection system can be minimized and the communication between the collection system and the endpoint device can be reduced while an accuracy of less than an hour for consumption data can be maintained.

The discussion provided above with reference to FIG. 1 is intended as a brief, general description of one meter reading system 100 capable of implementing various features of the disclosed subject matter. While the description above is made with reference to particular devices linked together through different interfaces, those skilled in the art will appreciate that the claimed subject matter may be implemented in other contexts.

Figure 2:
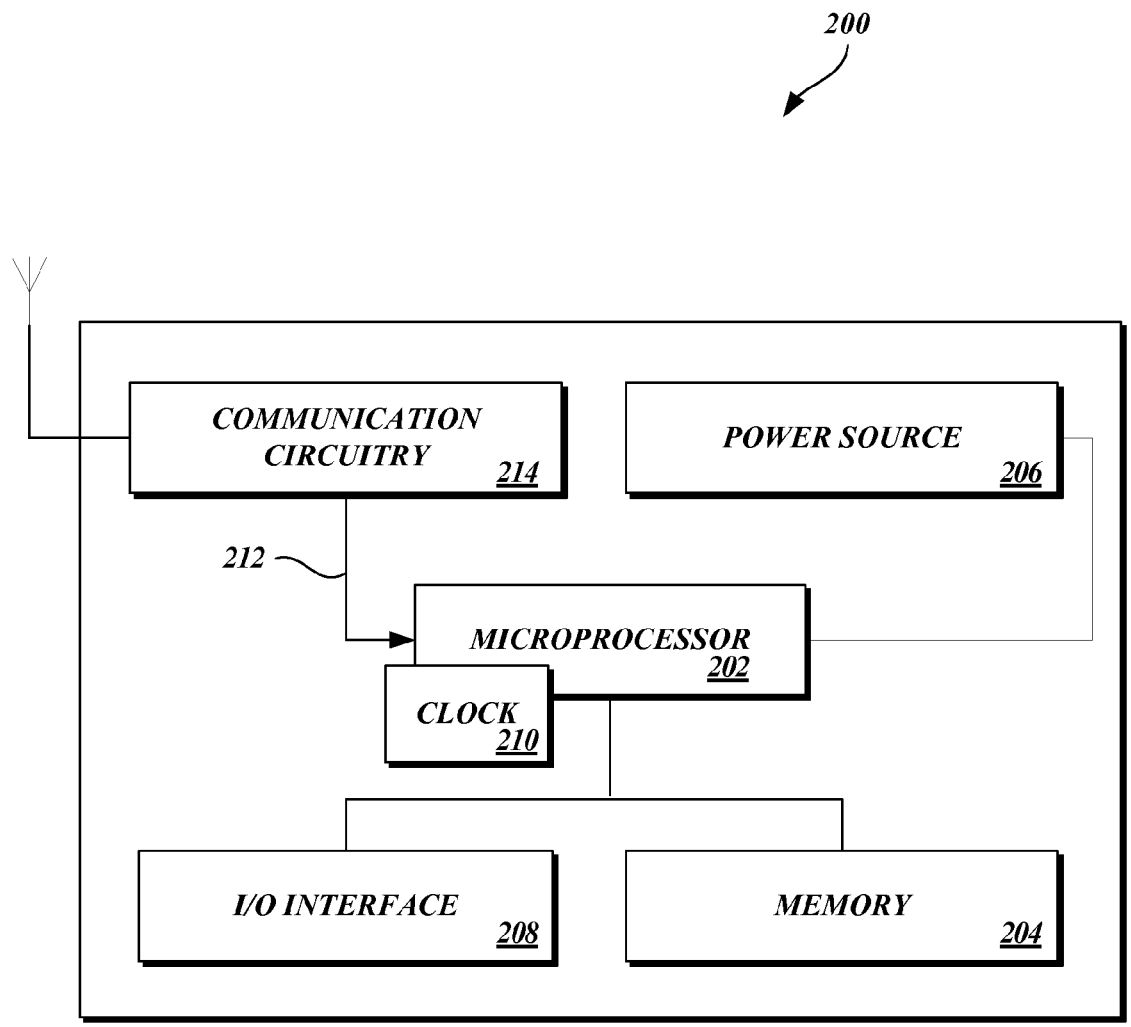
FIG. 2 is a block diagram illustrating components of one example of an endpoint device in accordance with an embodiment of the disclosed subject matter.

Now with reference to FIG. 2, an example component architecture for the endpoint device 200 will be described. Generally described, the endpoint device 200 includes a processor 202, a timing device or clock 210, and a memory 204, connected by a communication bus 212. As further depicted in FIG. 2, the endpoint device 200 includes an interface component 208 operable for communication with a corresponding utility meter (not shown) and a power source component 206, such as a battery or the like. The endpoint device 200 may further include communication circuitry 214 for transmitting/receiving wireless communications with other radio-based devices (e.g., collection systems, etc.) or a network.

In one aspect, the processor 202 is a microprocessor operable to perform timing and recording operations in connection with the timing device or clock 210 (e.g., a microcontroller-implemented timing clock, a radio timing clock, etc.). In one embodiment, the clock 210 is a simple inexpensive clock that is used to measure relative time in the endpoint device. For example, the clock 210 may be a slow crystal oscillator incremented by 2 seconds, which is configured to count every 60 minutes (an hour) and triggers recording of meter reading data at hourly intervals (or, alternatively, particular intervals set by the meter reading system). In one embodiment, the clock 210 tracks minutes but may not track hours. In that embodiment, it is assumed that the clock 210 contains the minute portion of a current date/time. For example, if the current time is 6:25 PM, Jun. 1, 2008 and the clock 210 reads 25 minutes, the relative time in the endpoint device is 25 minutes passed the current hour, 6:00 PM.

In some embodiments, the endpoint device contains in memory 204 a log of "recorded intervals" (meter reading data collected for the last 40 days at hourly intervals), a "partial hour interval" (meter reading data collected at an interval that is less than an hour), the "total consumption," and the like. As used herein, the term, "interval" or "recorded interval," refers to meter reading data collected during a particular hour, which is associated with an interval number that generally indicates a number of hours passed from the current time. As discussed above, the clock of the endpoint device counts every 60 minutes and triggers recording of a "recorded interval" for that hour. The recording process will be discussed in further detail below in connection with FIG. 3.

In some embodiments, the endpoint device keeps a log of 960 recorded intervals (i.e., a log of the last 40 days of hourly intervals) in the memory 204. As will be understood by one skilled in the art, the number of maximum recorded intervals, the number of days, or the like is a design choice and may change based on the intended application. Thus, the aforementioned embodiments should not be considered as limiting the scope of the claimed subject matter. As will be well understood, since each recorded interval is generated based on a relative time maintained by the clock in the endpoint device rather than an absolute time (real time), the endpoint device does not need to maintain accurate time/date data in order to read meter reading data from the utility meter based on a real time/date. In addition, the meter reading data accumulated during a certain time period can be readily retrieved from the log of recorded intervals if it is known how many numbers of intervals the endpoint device needs to go back. This simplifies logic in the endpoint device that is implemented in response to a consumption data request from the collection system. Further, keeping many days of intervals in the endpoint device is very useful. For example, the log containing days of intervals may be used to calculate the correct consumption for any time period. If there is an interruption (power failure) in communication or in the system (missing data because of the interruption), the data can be recovered from the log of recorded intervals as long as the collection system knows what time and how long. In one embodiment, a certain set of recorded intervals may be used to obtain time of use or load profile information. For example, as will be well understood by one skilled in the art, in the utility industry, in order to reduce costs, consumers are encouraged to spread out or shift energy consumption. In some instances, the amount the consumer is billed depends on time of use, and/or load profile information. That is, the consumer is charged at different rates depending on the time/date that the energy is consumed by the consumer. In some embodiments, the collection system may obtain a certain set of recorded intervals (e.g., 24 hours of recorded intervals from a specified time) that can be used to estimate the time of use and load profile information over a 24 hours period of time. In some other embodiments, once a month, the collection system may obtain a set of recorded intervals corresponding to the 40 days of daily meter readings, which can be used to perform load profiling or load balancing over a 40 day period of time.

The logging/recording process will be discussed in further detail in connection with FIG. 3 and thus the logging/recording process will only be briefly discussed here. By way of example, an exemplary table showing recorded intervals (including the last interval for "12:00 PM-1:00 PM, Apr. 22, 2008"), a partial hour interval, and total consumption stored in the endpoint device at one point of time is as follows:

TABLE 1

| Consumption | 123450 | 12:05 PM Jun. 1$^{st}$, 2008 |
| Partial hour | 3 | 12:00 PM-12:05 PM Jun. 1st, 2008 |

| Interval # | Value | |
| --- | --- | --- |
| 1 | 12 | 11:00 AM-12:00 PM Jun. 1st, 2008 |
| 2 | 3 | 10:00 AM-11:00 AM Jun. 1st, 2008 |
| 3 | 2 | 9:00 AM-10:00 AM Jun. 1st, 2008 |
| 4 | 5 | 8:00 AM-9:00 AM Jun. 1st, 2008 |
| . | . | |
| . | . | |
| 960 | 2 | 12:00 PM-1:00 PM Apr. 22nd, 2008 |

Generally described, to obtain the consumption data that have been collected during a certain time period, the collection system may send a request message that asks the endpoint device to go back a certain number of hours. In one aspect, the collection system can readily determine the last interval hour based on the current time kept by the endpoint device (since the endpoint device keeps 960 intervals at any time) and request consumption data accordingly. In this regard, the collection system can request consumption of any time from the last interval. As shown above, the last (e.g., 960$^{th}$ hour) interval is "12:00 PM-1:00 PM, Apr. 22, 2008" which can be determined from the current time, 12:05 PM Jun. 1, 2008. The first recorded interval for "11:00 AM-12:00 PM Jun. 1, 2008" is the most recent record in the log. In one aspect, the endpoint device is configured to record the intervals without any interruption or gaps in the intervals.

For ease of discussion, consider a scenario where, at 12:05 PM Jun. 1, 2008, the collection system requests from the endpoint device the consumption data of a specific time, for example 9:00 AM Jun. 1, 2008 (i.e., consumption data that have been collected from the last interval to 9:00 AM Jun. 1, 2008). In this regard, the collection system may request the endpoint device to go back three intervals to get the consumption data in question. In response to the request, the endpoint device obtains the current consumption, a partial hour interval and the last three intervals (for 3 hours), and subtracts the amount consumed between the current time (12:05 PM Jun. 1, 2008) and the requested time (9 AM Jun. 1, 2008) from the total consumption. Based on the table above, the amount consumed between the current time and the requested time is "20" since 3 (partial)+12 (first interval)+3 (second interval)+2 (third interval)=20. The endpoint device returns the requested consumption data (123450−20=123430), the consumption data of 9:00 AM Jun. 1, 2008, to the collection system.

In one embodiment, the endpoint device may maintain a log of records, each record containing the absolute meter reading data (i.e., actual meter reading) taken at a corresponding time interval. In one embodiment, the absolute meter reading data are taken at each hourly interval. In this embodiment, the consumption data for a specific time period can be obtained by retrieving a particular record.

By way of example, an exemplary table showing records containing the absolute meter reading data for each time interval and the current consumption data stored in the endpoint device at one point of time is as follows:

TABLE 2

| Consumption | 123450 | 12:05 PM Jun. 1st, 2008 |
|---|---|---|
| Interval # | Value | |
| 1 | 123435 | 11:00 AM-12:00 PM Jun. 1st, 2008 |
| 2 | 123432 | 10:00 AM-11:00 AM Jun. 1st, 2008 |
| 3 | 123430 | 9:00 AM-10:00 AM Jun. 1st, 2008 |
| 4 | 123425 | 8:00 AM-9:00 AM Jun. 1st, 2008 |
| . | . | |
| . | . | |
| . | . | |
| 960 | 118434 | 12:00 PM-1:00 PM Apr. 22nd, 2008 |

Referring back to the scenario discussed above, assume that the collection system requests the endpoint device to go back three intervals to get the consumption data in question. In this case, since the absolute meter reading data is readily available, the endpoint device retrieves a record containing the absolute meter reading data (123430) taken at the third interval, "9:00 AM-10:00 AM Jun. 1, 2008".

It should be well understood that the above tables and the aforementioned scenarios are provided as examples and should not be construed as limiting the claimed subject matter. The number of maximum recorded intervals, the number of days, whether to store actual meter reading or intervals, the length of a time interval, or the like is a design choice and may change based on the intended application.

Figure 3:
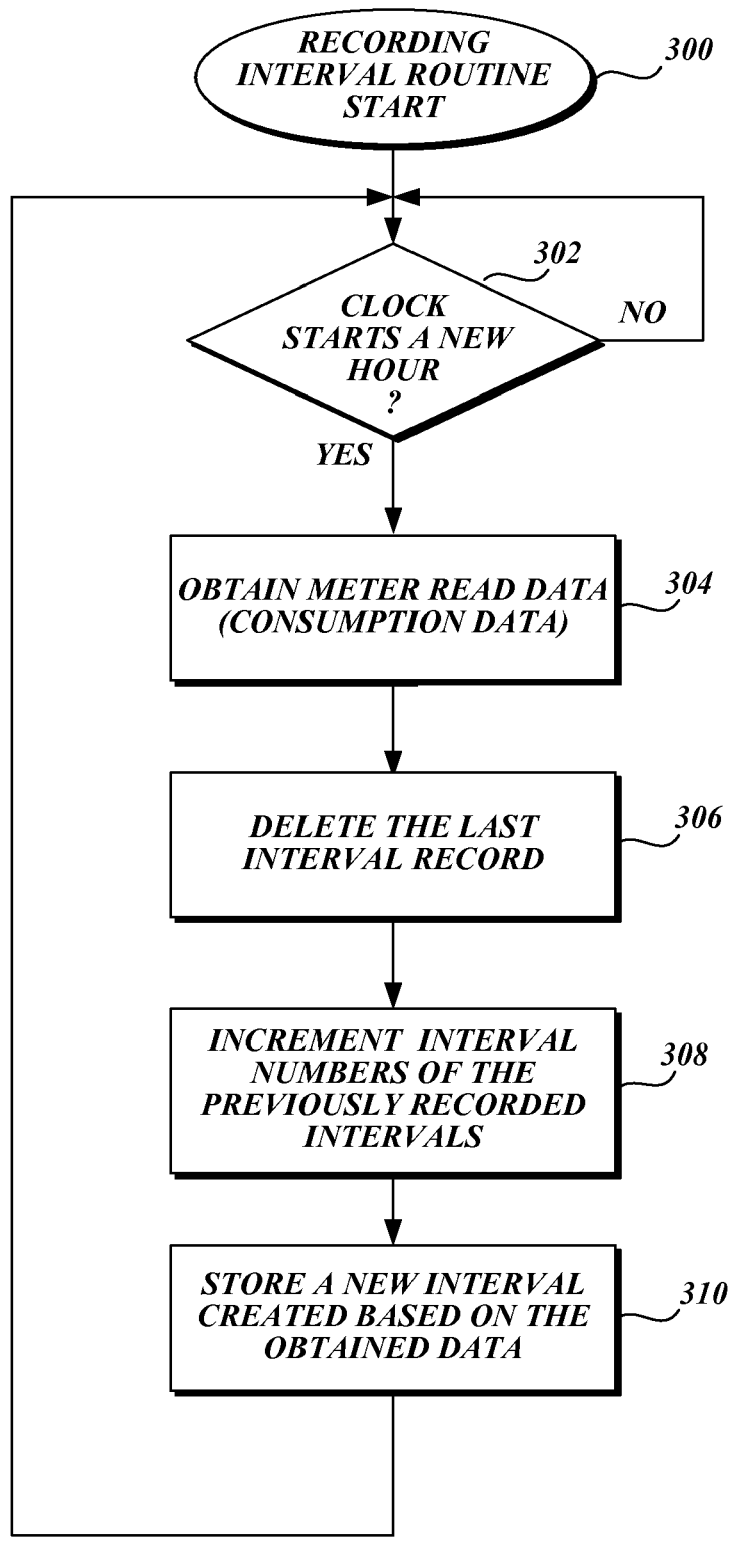
FIG. 3 is a flow diagram of one example routine for logging meter reading at each predetermined interval in accordance with an embodiment of the disclosed subject matter.

Now referring to FIG. 3, a flow diagram of a recording interval routine 300 for logging and managing meter reading data according to a relative time clock is illustrated in accordance with one embodiment of the disclosed subject matter. The recording interval routine 300 begins with block 302 where a determination is made as to whether the clock of the endpoint device starts a new hour. As mentioned above, the clock of the endpoint device may be a relative time clock that maintains a relative time in the endpoint device. The recorded intervals and assigned interval numbers are generated according to the relative time clock. In one embodiment, the clock of the endpoint device tracks minutes of the hour and, at the start of a new hour, triggers an hourly interval recording of meter reading data. In this regard, at the start of each new hour, meter reading data is read from the meter for recording a new recorded interval. The new recorded interval is stored in the memory of the endpoint device. If it is determined that the new hour has not started at decision block 302, the routine returns to decision block 302.

If it is determined at decision block 302 that the clock starts a new hour (i.e., after each 60 minutes), a meter reading data is obtained from the associated utility meter for generating a new recorded interval for the previous hour as illustrated in block 304. For example, at 2:00 PM, the endpoint device generates a new recorded interval for 1:00 PM-2:00 PM. At block 306, the last recorded interval in the log is deleted from the memory to maintain a fixed number of recorded intervals at any time. As discussed above, the endpoint device maintains a predetermined number of recorded intervals, for example, 960 recorded intervals. Thus, before adding a new recorded interval, the last recorded interval is removed from the memory. At block 308, the order of the existing recorded intervals that were previously stored is updated so that the new recorded interval is stored as the first recorded interval. In one embodiment, each recorded interval has an associated interval number, as shown in the above-mentioned tables. In that embodiment, the interval numbers of the existing recorded intervals are incremented. An example of the recorded intervals and the interval numbers are shown in the table discussed above. At block 310, a new recorded interval (with interval #1) created for the meter reading data at the start of a new hour is stored in the memory of the endpoint device. The routine 300 returns to block 302 where the routine repeats the above-mentioned steps.

It should be well understood that recording interval routine 300 described above with reference to FIG. 3 does not show all of the steps and functions performed within the endpoint device or the meter reading system. Although the recording interval routine 300 generally describes the logging and managing process that is triggered hourly by the clock, the logging and managing process can be triggered at particular intervals set by the meter reading system. Those skilled in the art and others will recognize that some steps and/or exchanges of data described above may be performed in a different order, omitted/added, or otherwise varied without departing from the scope of the claimed subject matter.

In one embodiment, as discussed previously, the endpoint device includes a relative time clock which tracks minutes and triggers recording of meter reading data for a particular hour at the end of that hour (or the start of a new hour after passing that particular hour). In that embodiment, in order to obtain a meter reading for the specific date/time from the endpoint device, the collection system may convert the specific date/time into a relative time that can be understood by the endpoint device. For example, the collection system determines an offset of recorded intervals (e.g., how many intervals (hours) the endpoint device needs to go back, etc.) based on the specific date/time. A representative embodiment of a collection system process is described in detail below in connection with FIG. 4.

As will be understood by one of ordinary skill in the art, the collection system can process various ranges of meter reading data received from the endpoint device in order to obtain consumption data for a specific period of time or to analyze the consumption data. In some embodiments, the collection system (e.g. reader device in a mobile collection system) may be configured to go out on a route for collecting monthly meter reading data. In those embodiments, the collection system may be configured to collect meter reading data from endpoint devices based on a work order list prepared for that route. When a work order list (or a meter reading route list) is generated for a routine meter data collection by the collection system, the work order list includes an order request generated with respect to the customer's request of meter reading (e.g., a request for the reading on the 10th).

In one aspect, for each order request, the collection system generates a request message to receive an appropriate set of intervals from an endpoint device. Generally described, the collection system reads the current date/time from its real time clock and converts an order time into a corresponding relative time, for example, an offset of intervals.

The current date/time in the collection system is used in the described embodiments because it is considered that the collection system has an accurate clock. It is well understood by one skilled in the art, in a typical meter reading system, the collection system regularly synchronizes its time to a network, GPS, or other source of precise (accurate) time to maintain an accurate clock.

For ease of discussion, consider a scenario where a meter reading request has been received from a customer who moved out at 1:00 PM on the 10th of the month and a work order to collect consumption data for the customer is created on the 15th of the month. The collection system is a mobile reader device that is scheduled to collect meter reading at a scheduled time, for example on the 30th of each month. In this scenario, the collection system will not start the collecting meter reading process until the 30th of the month. During the collecting meter reading process, the collection system reads the current date/time from its real time clock and calculates an offset of interval numbers. In these scenarios, the offset may be the number of hours back from the current time to get to a meter reading at 1:00 PM on the 10th.

As discussed previously, in one aspect, the recorded intervals stored in the endpoint device may be used to determine consumption data for any time period from the past 40 days, which allows the collection system to collect meter reading data in later time (e.g., on $30^{th}$ of each month), on its own schedule. Also, the endpoint device uses a relative time clock to record the meter reading data, which simplifies logic of the endpoint device to collect meter reading from the utility meter. Further, the endpoint devices and the collection system do not need to be accurately synchronized to each other all the time if the consumption data is calculated at a specific hour but not at specific minutes.

In some embodiments, it may be desirable to collect the 40 days of daily meter reads taken at a specific time of day. In this case, the data is returned as snapshot of daily intervals at the specific time of day and a current consumption. In these embodiments, a relative time is determined by the collection system calculating the appropriate number of intervals based on the current time and a requested time for consumption data. Specific meter reading data can then be obtained by subtracting the appropriate number of intervals from the current consumption to get an absolute consumption value on any given day. This would be useful to determine consumption data of a utility that has multiple move/in move/out transactions in one month. Further, the meter reading data can be determined after two messages exchanged between the endpoint device and the collection system. That is, the collection system sends one request to the endpoint device of the utility and receives one response. The specific consumption data are then processed later, perhaps within the billing system or on the fly.

As will be understood by one skilled in the art, the time of the endpoint device often drifts and thus it may be desirable to regularly synchronize the clock of the endpoint to an external clock. However, even if the clock of the endpoint is not synchronized (not calibrated) to an external clock regularly, the point where the endpoint device records data can be up to one hour off (an accuracy of one hour) in a worst case scenario. Further, even when an endpoint device includes, to conserve battery power, a low power clock, such as a slow crystal oscillator, which can drift 15-20 seconds per day, or 10-15 minutes in a 40 day period, the worst case error in accuracy of the intervals will be a cumulative error, looking back over 40 days, of less than 10-15 minutes by the $40^{th}$ day. Thus, the error in accuracy of each interval, for example, the error per an hourly interval, is less than one second in these embodiments.

Figure 4:
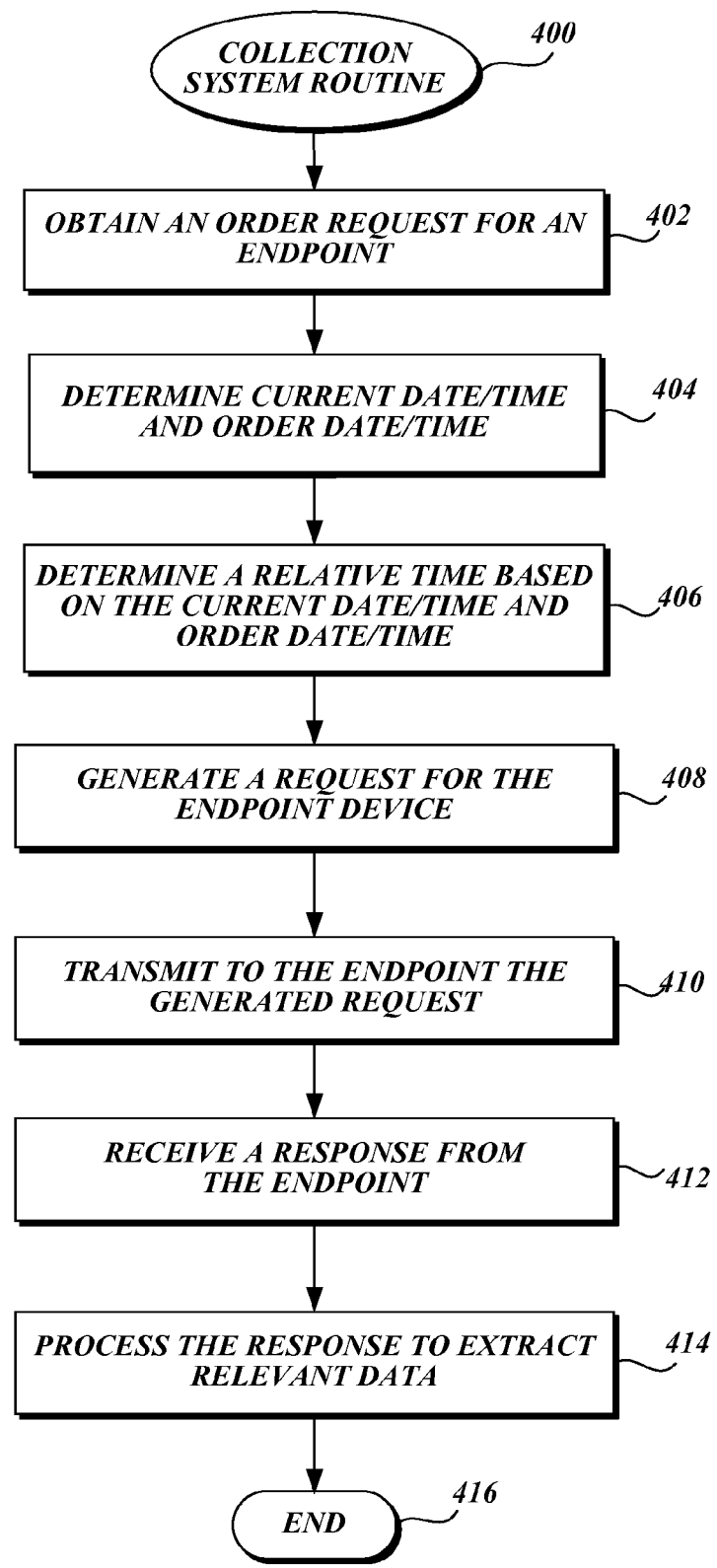
FIG. 4 is a flow diagram of one example collection system routine for determining an interval offset for a consumption request and obtaining meter reading data from each endpoint device.

Referring now to FIG. 4, a flow diagram depicts a collection system routine 400 for obtaining meter reading data that have been recorded based on a relative time maintained in each endpoint device. The collection system process routine 400 begins with block 402 where an order request for consumption data collected from an endpoint device is obtained. In one embodiment, the collection system may obtain a work order list for meter readings of a group of endpoint devices, which contains a list of order requests. In some cases, the work order list may contain one or more order requests for one particular endpoint device. For example, if a customer moves out on January $10^{th}$ and another customer moves in on January $14^{th}$, two order requests for the corresponding endpoint device are generated for the collection system to process.

As will be discussed below, the collection system can obtain the entire set of recorded intervals from each endpoint device for each month and process the entire set to obtain consumption data for a specific date/time. At block 404, a current date/time is determined from a real time clock of the collection system. The requested date/time for consumption data is also extracted from each order request at block 404.

Next, at block 406, the collection system determines, based on the current time/date and the requested time/date, a relative time of the requested date/time that can be understood by the endpoint device. For example, the collection system calculates an offset of interval numbers that can be used by the endpoint device to retrieve a correct set of recorded intervals. At block 408, a request message for asking the endpoint device to transmit the meter reading data for the specific date/time is generated. The request message may include the determined offset that indicates how many intervals the endpoint device needs to go back to obtain the requested meter reading data. In an alternative embodiment, the request message includes the current time of the collection system so that the endpoint device can adjust its relative time clock to the current time of the collection system. In another embodiment, the request message may include a command requesting the endpoint device to transmit a set of the recorded intervals that corresponds to meter reading data collected at a specific time of each of the 40 days. In yet another embodiment, the request message includes a command requesting the endpoint device to transmit daily meter readings or 24 hour meter readings collected at a predetermined hour.

Subsequently, the generated request message is transmitted to the endpoint device at block 410. As discussed above, in some instances, more than one request message may be generated for one endpoint device if there are more than one order requests. Upon receipt of the request from the collection system, the endpoint device retrieves a certain set of recorded intervals (e.g., the recorded intervals for a specific time period, the entire recorded intervals, 40 days of daily intervals where the interval starts at a specified hour, 24 hours of intervals taken from a specified hour, or the like) and transmits a response including the retrieved recorded intervals or calculated consumption data for a requested time according to the request. At block 412, the collection system receives from the endpoint the response to the request.

Next, the received response is processed to extract meter reading data relevant to the request or the order request as illustrated at block 414. As discussed above, the extracted meter reading data may depend on the type of requested meter reading data, for example, consumption data for a specific time period, meter reading data of the past 40 days, meter reading data of each 24 hour at a specific hour, daily meter reading data of 40 days, or the like. At block 416, the extracted meter reading data may be associated with the corresponding order request and stored in the collection system. In one embodiment, the extracted meter reading data may be processed later in the utility system. The routine 400 then terminates at block 418.

It should be well understood that the routine 400 described above with reference to FIG. 4 does not show all of the functions and steps performed within the collection system or endpoint devices. Instead, the routine 400 generally describes the processes performed to obtain meter reading data from the endpoint device that operates in accordance with a relative time clock. Accordingly, those skilled in the art and others will recognize that some functions/steps and/or exchange of data described above may be performed in a different order, omitted/added, or otherwise varied without departing from the scope of the claimed subject matter.

It will be appreciated that in one embodiment, the clock of the endpoint device may be adjusted to an external clock at a predetermined interval, for example, every 24 hours, or the like. In other embodiments, the clock of the endpoint device is not adjusted to an external clock. In any instance, the collection system process routine 400 described above with reference to FIG. 4 allows the collection system device to obtain desired meter reading data from the endpoint with very high accuracy. In a worst-case scenario involving a non-time synchronized meter reading system, the disclosed subject matter guarantees that consumption data will be accurate to within an hour over a period of 40 days.

While embodiments of the claimed subject matter have been illustrated and described, it will be appreciated that various changes can be made therein without departing from the spirit and scope of the claimed subject matter.

The embodiments of the invention in which an exclusive property or privilege is claimed are defined as follows:

1. An apparatus for obtaining meter reading data from an endpoint device that is configured to operate in accordance with a relative time clock, the apparatus comprising:
 a communication unit for obtaining a first request to receive meter reading data from an endpoint device; and
 a processing unit operable to:
  determine a requested time specified in the first request;
  convert the requested time into a relative time that is used by the endpoint device to retrieve a correct set of recorded intervals;
  generate a second request including the converted relative time;
  cause the communication unit to transmit to the endpoint device the generated second request; and
  wherein after the communication unit receives from the endpoint device a response to the transmitted second request, the processing unit processes the response to extract data relevant to the first request.

2. The apparatus of claim 1, wherein the response includes a set of recorded intervals.

3. The apparatus of claim 1, wherein the meter reading data is obtained from a utility meter at each time interval that is measured by a relative time clock of the endpoint device.

4. The apparatus of claim 3, wherein the meter reading data obtained at a time interval are recorded to generate a recorded interval; and
 the time interval information and the generated record interval are stored in the endpoint device.

5. The apparatus of claim 3, wherein the relative time clock tracks minutes of each time interval and triggers generating a recorded interval at a start of a time interval.

6. The apparatus of claim 3, wherein an interval number is assigned with each recorded interval.

7. The apparatus of claim 3, wherein the interval number indicates the number of time intervals passed from the time when the meter reading data contained in the recorded interval was collected.

8. The apparatus of claim 3, wherein converting the order time includes calculating an offset of interval numbers based on the current time of the collection system and the order time.

* * * * *